Figure 1:
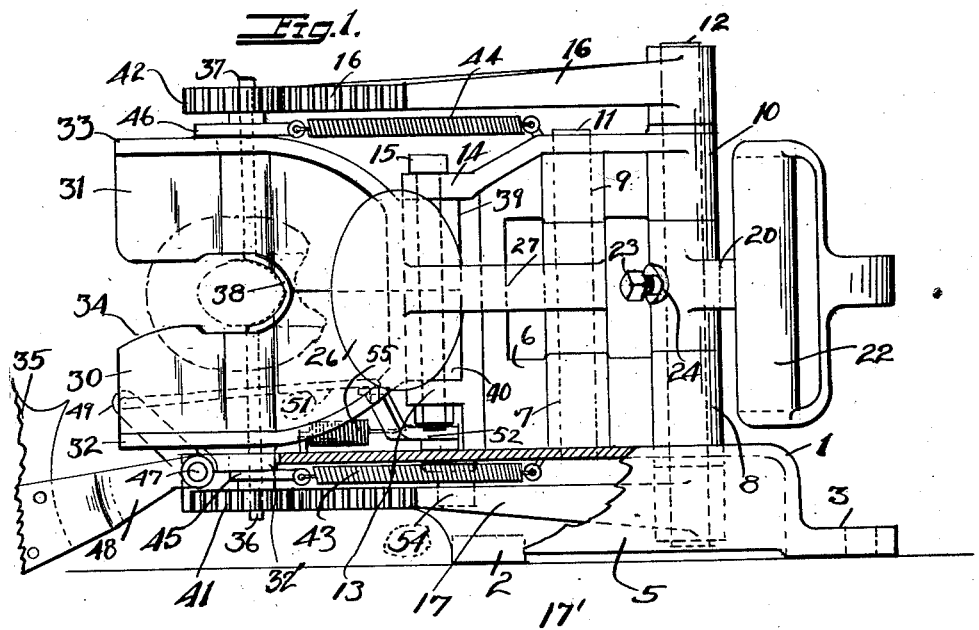

Dec. 16, 1930.　　　A. R. THOMPSON　　　1,785,017
FRUIT PITTING MACHINE
Filed March 29, 1926　　　3 Sheets-Sheet 1

INVENTOR.
A. R. Thompson.
BY
Carlos P. Griffin
ATTORNEY.

Dec. 16, 1930.  A. R. THOMPSON  1,785,017
FRUIT PITTING MACHINE
Filed March 29, 1926  3 Sheets-Sheet 2
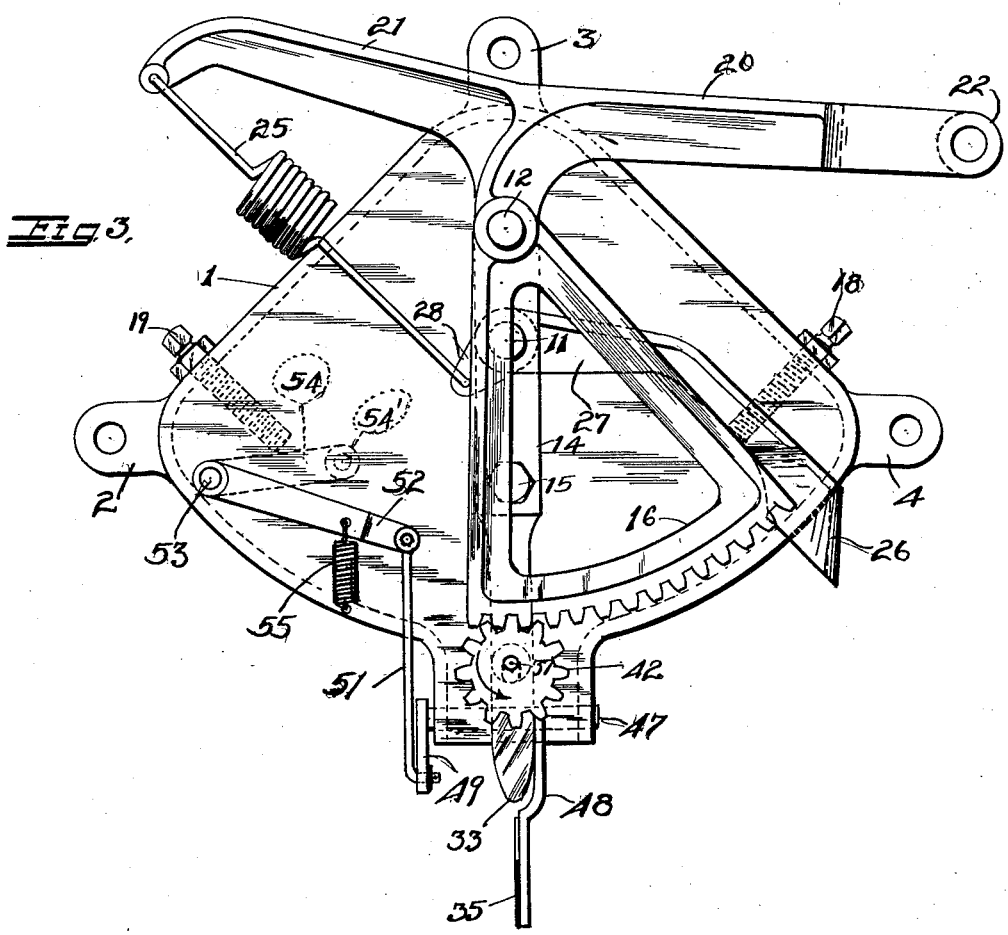
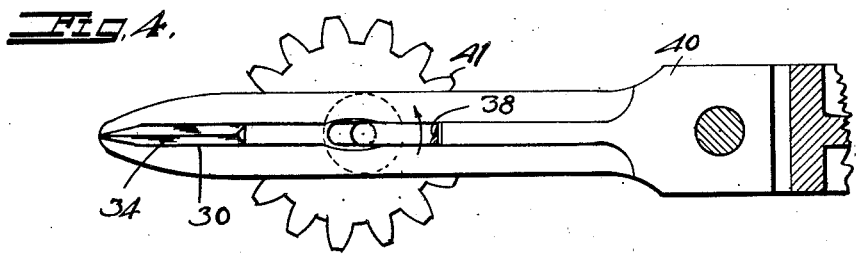
INVENTOR.
A. R. Thompson.
BY
Carlos P. Griffin
ATTORNEY.

Dec. 16, 1930.  A. R. THOMPSON  1,785,017
FRUIT PITTING MACHINE
Filed March 29, 1926   3 Sheets-Sheet 3
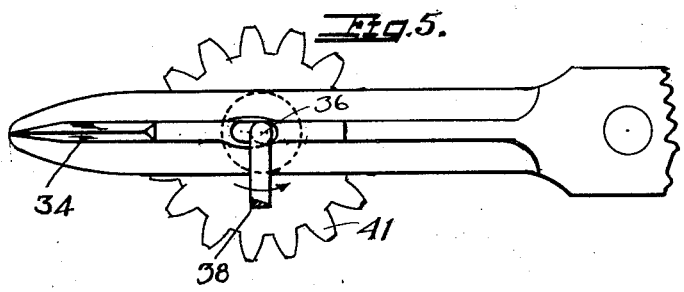
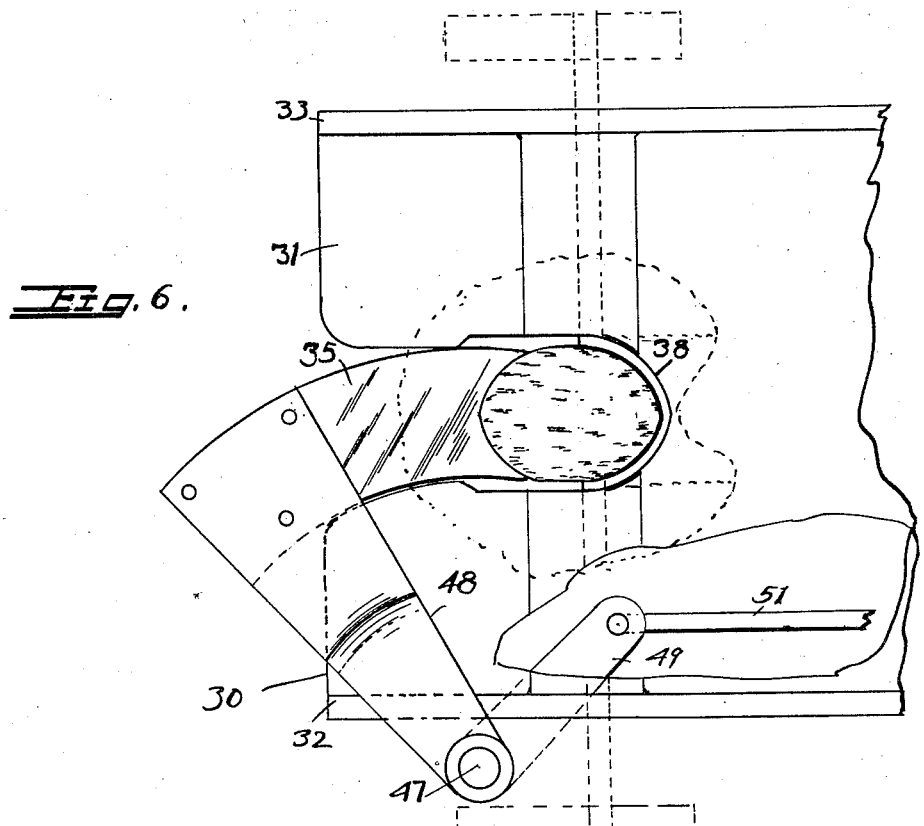

Patented Dec. 16, 1930

1,785,017

UNITED STATES PATENT OFFICE

ALBERT R. THOMPSON, OF SAN JOSE, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT-PITTING MACHINE

Application filed March 29, 1926. Serial No. 98,077.

This invention relates to a pitter for cling peaches and other fruits in which the pit or core is tightly secured to the pulp of the fruit, and an object of the invention is to provide means whereby the coring knife will be so moved as to closely follow the core or pit thereby wasting the minimum of valuable pulp.

It will be further understood by those skilled in the art, that it is substantially impossible to successfully operate a rotary pitting knife of the type herein disclosed unless the fruit is partially split to allow the pitting knife to pass partly into the fruit and to provide the necessary holding surfaces to center and hold the fruit, and this machine provides the minimum of such advance splitting of the fruit.

Another object of the invention is to so arrange the operation of the cutters as to leave the front portion of the fruit intact until near the end of the movement of the pitting knife, thereby holding the fruit in a better position for pitting, whereupon the final cut at the front of the fruit is made to sever the fruit in halves.

Another object of the invention is to produce a pitter of such character as to enable the fruit to be pitted by simply pushing the fruit on the splitting knife without turning the fruit, thereby eliminating one hand movement described in my patent application, Serial No. 62,377 and thereby speeding the work.

Another object of the invention is to so arrange the travel of the pitting knife as to permit it to be used in connection with fruits having elongated cores or pits, without waste of the pulp.

Another object of the invention is to produce a pitter which will hold the fruit in its most stable position so that the force applied to it to cut out the pit will not dislodge the fruit from the splitting knife or the holder.

It will be understood by those skilled in the art that fruits of the character that this machine is intended to operate upon are usually rather solid, and have the pit closer to the surface at the stem end while the pit is aligned with a crease showing on the outside of the fruit. It is thus possible to always properly adjust the fruit in the machine, care always being taken to push the fruit on the splitting knife stem first and with the crease up, thereby making very little splitting necessary at the stem end.

Another object of the invention is to provide as small a pitting knife as possible, and to give it a forward and rearward travel to cause it to follow the form of the fruit pit as nearly as possible.

Another object of the invention is to make it possible to pit peaches which have a split pit. It will be understood by those skilled in the art that in machines of this character the tenacity with which the pit holds to the pulp and its solidity are mechanical forces made use of to effect the removal of the pit, but if it happens that the pit is split in two that as soon as the operator pushes the peach in and turns it 90 degrees in one of my previous machines described in the above mentioned patent application, the halves drop away and must be pitted by hand, but with this machine the pulp is not separated at the top and bottom of the fruit enough to allow it to fall away, and the coring knife will act on split pits the same as on solid pits, the halves not being split apart until the coring or pitting is substantially completed.

Other objects of the invention will appear as the description proceeds.

An embodiment of the invention is shown in the accompanying drawings in which the same reference numeral is applied to the same portion throughout, but I am aware that there may be modifications thereof.

Figure 2:
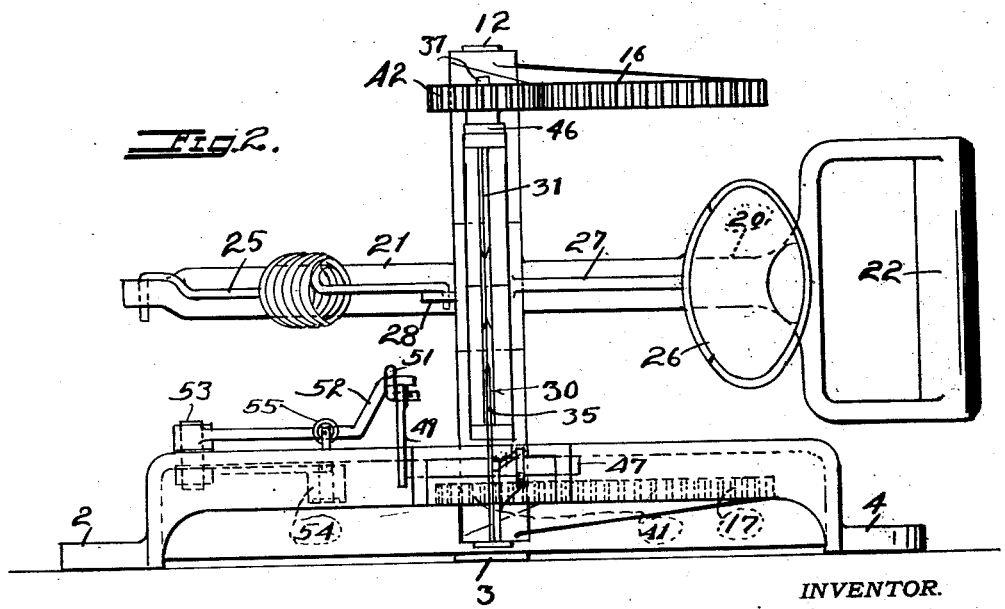

Figure 1 is a side elevation of the complete machine, showing a fruit ready to be pitted, Figure 2 is a front elevation of the complete machine, Figure 3 is a plan view of the machine, Figure 4 is a plan view of one of the splitting knife members, showing the pitting knife in section with its lower drive pinion, Figure 5 is a view similar to Figure 4 with the pitting knife partially rotated, and, Figure 6 is a side elevation of the final splitter making the last cut in the bottom of the fruit, the levers being so arranged as to complete this cut as the pitter is at its final position.

The machine has a flat base 1 with three short legs 2, 3 and 4 to secure it to a table in front of which the worker sits, said base having a flange 5 extending almost to the table top.

Near the center of the back of the base there is a vertical web 6 provided with bearings 7, 8, 9 and 10 to receive two vertical shafts 11 and 12. At the front edge of the flange or web 6 it has two lugs 13 and 14 to receive a bolt 15.

The shaft 12 has the segment gears 16 and 17 secured thereto at top and bottom respectively. The gear 17 is below the base 1 and the set screws 18, 19 determine the exact movement of both of said segments, i. e. their starting and stopping positions.

The hand lever 20 has an extension 21 and hand grip 22 and is loosely mounted on the shaft 12, but a pin 23 screwed into the shaft 12 and passing through a slot 24 in the hand lever provides sufficient lost motion of the handle 20 with respect to the shaft 12 to insure the spring 25 seating the holding cup 26 on the arm 27 on the fruit before the pitting knife starts. The spring 25 is connected to the short arm 28 of the lever 27 and its length is such that very little actual pressure is placed on the fruit because the arm 21 passes over the center at about the time the cup touches the fruit. The lever 27 is mounted on the shaft 11.

The bolt 15 supports and secures the two splitting members in place, each being identical with the other in having a vertically extending splitting knife as shown at 30 and 31 provided with a heavy flange at their edges as shown at 32 and 33, but the lower knife has its upper corner cut away as shown at 34 to allow the final splitting knife 35 to move into the position shown in Figure 6. About the middle of the knives 30, 31 they each have a vertical slot to receive the two small shafts 36, 37 which are integral with the curved pitting knife 38.

At the back the two knives 30, 31 have the lugs 39, 40 to receive the bolt 15 to hold them in the proper position in the machine.

The shafts 36, 37 carry pinions 41, 42 respectively which are held in mesh with their respective segment gears by the two spiral springs 43, 44, said springs being secured to the frame of the machine and to the slide plates 45, 46 respectively, through which slide plates the shafts 35, 36 respectively extend.

At the center of the front of the base there is a short horizontal shaft 47 carrying two arms 48 and 49, the former to support the final splitting knife 35 and the latter to be connected by the link 51 to the lever 52 on the top of a short vertical shaft 53. At its lower end the shaft 53 has a lever 54 against which the lower segment gear 17 strikes to effect the operation of the knife 35.

A spiral spring 55 connected to the front of the base 1 and to the lever 52 tends to hold the knife 35 normally in the position of Figure 1 so as to be out of the way of the operator in placing a fruit on the splitting knife.

Now it will be seen that the shafts 36 and 37 are not centrally mounted in their respective pinions so that while said pinions will be rotated by the movement of the segment gears and while the springs 43, 44 will hold the pinions in contact with the segment gears that the shafts and the curved pitting knife will advance to produce a flattened oblate spheroid almost exactly the shape of the pit to be removed and the latter will have the minimum pulp adhering thereto.

The operation of the machine is as follows: Assuming the machine to be secured to a suitable table the operator sits in front of the machine and with the left hand places the fruit in position on the knife blades 30, 31 care being taken to have the stem end in the position indicated in dotted lines Figure 1. This will cut the fruit top and bottom substantially to the pit and will leave only two narrow shoulders at the stem end through which the knife 38 can be crushed. Thereupon the operator pulls the handle 22 forward, first bringing the cup 26 against the fruit, and then causing the rotation, with a forward and backward movement, of the knife 38. Near the end of the movement of the gear segment 17 it contacts with the arm 54 and causes the knife 35 to finally split the bud end of the fruit. The handle is then restored to the starting position and another fruit placed in position to be cut.

In order to hold the splitting knives in the straight forward position the knife frame 32 has a depending base 32' extending into a slot in the front of the base 1.

It will be seen that the form of pitting knife 38, used in this case may be used advantageously in the form of pitter shown in my previous application above referred to, where it may be desired to more closely approximate the shape of the seed in the event that a smaller fruit loss is sought, in which event the operator would turn the fruit exactly as is done in that case, and the knife 38 would be shaped so that with its lateral movement it would cut the closest percentage of fruit meat off the pit.

What I claim is as follows, but the modifications may be made in carrying out the invention shown in the drawings and in the above particularly described form thereof, within the purview of the invention, as defined by the annexed claims.

1. A fruit pitting machine comprising a splitting knife having a slot to receive the seed of the fruit, a rotary pitting knife, a knife to split the bud end of the fruit near the end of the movement of the pitting knife, and a hand lever for operating.

2. A fruit pitting machine comprising a splitting knife having a slot to receive the seed of the fruit, a rotary pitting knife, means to advance said knife when it rotates, means to return said knife to the starting point as it completes its rotation, and means to split the bud end of the fruit near the end of the operation.

3. A fruit pitting machine comprising a frame, a splitting knife therein provided with a slot to receive the fruit seed, a rotary pitting knife curved to fit one end of the fruit seed, means to rotate, advance and retract said knife whereby an oblate spheroid is cut from the fruit with the seed, and means to finish splitting the fruit near the end of the coring operation.

4. A fruit pitting machine comprising a frame, a fixed splitting knife having an opening to receive the fruit seed, a rotary knife shaped to fit one end of the seed, means to so turn the latter knife that it will cut a flattened spheroid with the seed from the fruit, and means to cut the finishing split near the end of the movement of the pitting knife.

5. A fruit pitting machine comprising a frame, a fixed splitting knife secured therein having a slot to receive a fruit seed, a rotary knife shaped to fit the fruit seed, means to turn the knife so that it will cut a flattened spheroid of pulp with the seed from the fruit, means to hold the fruit securely against one side of the splitting knife, and means to cut the split near the end of the movement of the pitting knife.

6. A fruit pitting machine comprising a frame, a fixed vertically extending splitting knife having an opening to receive a fruit seed, a rotary knife shaped to fit the seed, means to turn the knife so it will cut a flattened spheroid from the fruit with the seed, and a pivotally mounted knife having means to operate it near the end of the movement of the pitting knife to completely split the fruit.

7. A fruit pitting machine comprising a splitting knife slotted to receive the seed of the fruit, a rotary pitting knife against which the fruit is pushed, and a pivoted knife having means to split the bud end of the fruit near the end of the movement of the pitting knife.

8. A fruit pitting machine comprising a frame, a detachable splitting knife mounted therein having a slot to receive a fruit seed, a rotary knife shaped to fit one end of the seed, pinions supporting said knife eccentrically with respect thereto whereby as the knife is rotated it will be given a movement of translation whereby a flattened spheroid of pulp with the seed will be cut from the fruit, and means to cut a finishing split at the bud end of the fruit near the end of the movement of the pitting knife.

9. A fruit pitting machine comprising a frame, a fixed vertically extending splitting knife having an opening to receive a fruit seed, a rotary knife shaped to fit one end of the seed, means to turn the knife 360 degrees, means to advance the knife as it is turning whereby a flattened spheroid will be cut from the fruit with the seed, a knife movable upon a substantially horizontal axis to finally split the fruit, and means to operate the latter knife near the end of the movement of the pitting knife.

10. A fruit pitting machine comprising a frame, a splitting knife in two sections mounted therein, and having a slot to receive a fruit seed, a rotary knife shaped to fit one end of the seed and against which the fruit and seed are pushed, pinions for supporting the rotary knife eccentrically with respect thereto whereby as the knife is rotated it will be given a movement of translation in slots of the splitting knife to cut a flattened spheroid of pulp with the seed from the fruit, and means to cut a finishing split at the bud end of the fruit near the end of the movement of the pitting knife.

11. A fruit pitting machine comprising a frame, a detachable splitting knife mounted therein having a slot to receive a fruit seed, a rotary knife shaped to fit one end of the seed, shafts carrying said knife extending through slots in the splitting knife, pinions for supporting said knife eccentrically with respect thereto whereby as the knife is rotated it will be given a movement of translation, segment gears for operating said pinions, springs for holding the pinions in engagement with said segment gears, and means to cut a finishing split at the bud end of the fruit near the end of the movement of the pitting knife.

12. A fruit pitting machine comprising a splitting knife having a slot to receive the seed of the fruit, a rotary pitting knife shaped to fit the seed, and means to rotate said pitting knife and move it laterally to remove the meat from the fruit pit.

13. A fruit pitting machine comprising a splitting knife having a slot to receive the seed of the fruit, a rotary pitting knife shaped to fit said seed, means to advance said knife and rotate it at the same time, and means to hold the fruit against the splitting knife.

14. A fruit pitting machine comprising a vertically extending splitting knife having a horizontal slot to receive the seed of a fruit, a curved pitting knife, means to advance said knife and rotate it as it advances to remove the meat from the seed of the fruit.

15. A fruit pitter comprising means to halve the flesh of the fruit and expose a substantial portion of the edge of the substantially intact pit, rotatable pitting means conforming approximately to said exposed edge, and mechanism to rotate said pitting means including elements to positively bodily shift the pitting means from an arcuate course while said means is rotated about the pit.

16. A fruit pitter comprising spaced blades arranged to form a cut around a substantial portion of the substantially intact pit of the peach to expose the edge of said pit, rotatable curved pitting means arranged to enter said cut and be centered with respect to said pit by engagement with said exposed edge, and mechanism to move said curved pitting means around a side of said pit in a non-circular path approximating the contour of said side.

17. A fruit pitter comprising means for halving the flesh of the fruit, a rotary pitting knife, means for rotating the pitting knife, and means to move the axis of the pitting knife during the rotation of the pitting knife.

18. In apparatus for pitting fruit, the combination of halving and pitting means, means for actuating the pitting means, and means adapted to move the pitting means relative to the halving means and in the plane of the halving means and during the actuation of the pitting means.

19. A fruit pitting machine comprising an initial splitting knife having a slot to receive the seed of the fruit, a rotary pitting knife, means for rotating the said rotary pitting knife to sever the flesh of the fruit from the pit, and final severing means for severing the flesh of the fruit along the slot formed in the said splitting knife.

20. A fruit pitting machine comprising a splitting knife having a slot to receive the seed of the fruit, a rotary cutting knife, means for rotating the said pitting knife, and means to split the butt end of the fruit at the end of the pitting operation.

21. In a fruit pitter, the combination of means for halving the flesh of the fruit, a rotary pitting knife, means for actuating the rotary pitting knife to revolve said knife and move the axis of said knife during its revolution to form an oblate spherical cut around the pit of the fruit.

22. A fruit pitting apparatus comprising a splitting knife having a horizontal slot to receive the seed of the fruit, a curved pitting knife, and means to advance said knife and rotate it as it advances to remove the meat from the seed of the fruit.

23. In a fruit pitter, means for halving the flesh of the fruit, means for engaging and holding the fruit, a rotary pitting knife, and means to move the axis of the rotary pitting knife relative to the fruit pit during the rotation of the said rotary pitting knife and means for rotating the rotary pitting knife.

24. In a fruit pitter, the combination of an impaling blade for partially halving the flesh of the fruit, a curved pitting knife, means for rotating the curved pitting knife around the pit of the fruit, and means exterior of the impaling blade for supporting the ends of said pitting knife, said means being constructed to permit longitudinal movement of the axis of the pitting knife in the plane of the impaling blade.

25. In a fruit pitter, the combination of an impaling blade for partially halving the flesh of the fruit, a curved pitting knife, means for rotating the pitting knife around the pit of the fruit, and means exterior of the impaling blade for supporting the ends of said pitting knife, said means being constructed to permit longitudinal movement of the axis of the pitting knife in the plane of the impaling blade, and means for completing the halving of the flesh of the fruit in the plane of the impaling blade near the end of the rotation of the pitting knife.

26. In a fruit pitter, the combination of an impaling blade having a pit receiving recess for partially halving the flesh of the fruit, means for holding the fruit on the impaling blade, a curved pitting knife having its axis mounted in the plane of the impaling blade, means for rotating the curved pitting knife around the pit of the fruit, means exterior of the impaling blade for supporting the ends of said pitting knife, said means being constructed to permit longitudinal movement of the axis of the pitting knife in the plane of the impaling blade, and means for completing the halving of the flesh of the fruit in the plane of the impaling blade near the end of the rotation of the curved pitting knife.

27. In a fruit pitter, the combination of impaling means, pitting means having a cutting edge, means for actuating the said pitting means, and means for moving the pitting means relative to the fruit pit during the actuation of the said pitting means to cause said pitting means to pass closely around the pit.

28. In a fruit pitting apparatus, the combination of means for having the flesh of the fruit in the plane of the greatest diameter of the pit of the fruit, a curved pitting knife having its axis in the plane of the cut, means to rotate the curved pitting knife, and means for moving the curved pitting knife during the actuation of the curved pitting knife to cause the curved pitting knife to follow closely the contour of the pit.

29. In an apparatus for pitting fruit, a slotted impaling blade upon which the fruit is impaled, means adapted to advance in the direction of the impaled fruit to confine the pit within the slot, and means for severing the intact pit from the halves of the fruit.

30. In an apparatus for pitting fruit, a bifurcated impaling blade upon which the fruit is impaled and by which the flesh of the fruit is substantially halved except for the rear end of the fruit as it is impaled on the impaling blade, and means for severing the flesh of the fruit at said rear end, the latter said means advancing in the direction in which the fruit is impaled on said impaling blade.

31. That step in the method of pitting a cling-stone peach consisting in cutting a core including the intact whole pit from the peach by a cut that begins and ends at the suture of the pit and follows a predetermined non-circular path independently of, but approximately following the contour of the pit.

32. A fruit pitter comprising means for halving the flesh of the fruit, leaving the pit intact, rotary pitting means, means for rotating said pitting means, and means independent of the pit sides for causing said pitting means to follow a non-circular predetermined path not dependent on the contour of the pit sides but approximating the contour of said sides.

In testimony whereof I have hereunto set my hand this 18th day of March A. D. 1926.

ALBERT R. THOMPSON.